(12) United States Patent
Greene, Jr.

(10) Patent No.: US 6,490,995 B2
(45) Date of Patent: Dec. 10, 2002

(54) AIR-CONDITIONED ANIMAL TRANSPORTER

(76) Inventor: George Jefferson Greene, Jr., 19970 Holly Hills Dr., LaRue, TX (US) 75770-9756

(*) Notice: Subject to any disclaimer, the term of this patent is extended or adjusted under 35 U.S.C. 154(b) by 0 days.

(21) Appl. No.: 09/929,747

(22) Filed: Aug. 14, 2001

(65) Prior Publication Data

US 2002/0023594 A1 Feb. 28, 2002

Related U.S. Application Data

(60) Provisional application No. 60/228,383, filed on Aug. 28, 2000.

(51) Int. Cl.7 .................................................. A01K 1/00
(52) U.S. Cl. ...................................... 119/496; 119/482
(58) Field of Search ................................ 119/496, 482, 119/420, 497; 62/239, 457.9, 259.1, 323.1

(56) References Cited

U.S. PATENT DOCUMENTS

| | | | | |
|---|---|---|---|---|
| 3,175,534 A | | 3/1965 | Pollard | |
| 4,878,359 A | * | 11/1989 | Manbell | 62/239 |
| 4,899,693 A | | 2/1990 | Arnold | 119/1 |
| 4,939,911 A | * | 7/1990 | Mandell | 62/239 |
| 5,282,439 A | * | 2/1994 | Oaks | 119/19 |
| 5,349,924 A | * | 9/1994 | Hooper, Jr. | 119/19 |
| 5,483,799 A | * | 1/1996 | Dalto | 62/3.7 |
| 5,692,386 A | | 12/1997 | Cassey, Sr. | 62/176.4 |
| 5,727,503 A | | 3/1998 | Whittaker | 119/500 |
| 5,755,180 A | * | 5/1998 | Smith | 119/72 |
| 5,761,992 A | | 6/1998 | Gallo | 99/468 |
| 5,762,129 A | * | 6/1998 | Elliot | 165/48.1 |
| 5,881,678 A | * | 3/1999 | Morley | 119/496 |
| 5,887,436 A | * | 3/1999 | Duddleston | 62/3.62 |

* cited by examiner

Primary Examiner—Charles T. Jordan
Assistant Examiner—Bret Hayes
(74) Attorney, Agent, or Firm—C. W. Alworth

(57) ABSTRACT

An apparatus for transporting in an air-conditioned environment animals. The apparatus uses crushed ice to air-condition an insulator animal container at approximately 74 degrees Fahrenheit in ambient temperatures up to 120 degrees Fahrenheit for 12 hours on one twenty pound charge of ice. The preferred embodiment is self-contained providing storage for the animal, ice, and electric power for a ventilation fan plus food and water. The device operates on 12 volts DC and may serve to transport animals in enclosed motor vehicles and common carriers including airline. An intrinsically safety backup system will keep the animal cool, provided ice is present, upon failure of the ventilation fan. An alternate embodiment is described for use by animal handlers in mini-vans and the like.

20 Claims, 6 Drawing Sheets

AIR-CONDITIONED ANIMAL TRANSPORTER

This application claims priority from U.S. Provisional Patent Application Serial No. 60/228,383 filed on Aug. 28, 2000.

The present invention relates generally to animal carriers, and more specifically to a portable cooled animal transporter that draws outside air over ice to provide the cooling and to provide fresh air to the caged animal within the transporter.

BACKGROUND OF THE INVENTION

Pet owners often travel with their pets. This travel can be as simple as taking their pet to the grocery store, laundry, or the like. The travel can be more complex such as taking their pet with them on a vacation to sending the animal by common carrier.

In the simple case the animal is generally placed in the family car (van or other vehicle) and taken to the destination. A problem is presented whenever the owner wishes to leave the animal in the vehicle. In winter there is no problem as the animal will be able to maintain its warmth through natural actions on its own part. In the summer, there is a major problem for the sun will raise the temperature within vehicle to well over 120 degrees Fahrenheit. This will kill the animal.

Many owners partially roll the vehicle windows down—a process called "cracking." The owner has to crack the windows so that the animal cannot escape and so that a potential thief cannot enter the vehicle. The end result is poor ventilation and the temperature within the vehicle will easily reach 120 degrees Fahrenheit.

Other animal owners often ship their animals by common carrier. For example, dogs are sent to dog shows (or to purchasers by a kennel) and cats are sent to cat shows (or to purchasers). In the winter, again few problems occur, because the common carrier will keep the animal in a fairly warm environment and the animal itself can provide warmth. The problem raises its head, again, in the summer months. Most common carriers will NOT accept animals when the ambient temperature (outside temperature at the airport) exceeds 85 degrees Fahrenheit. The carrier is concerned for the welfare of the animal, for the cage temperature will equal that of the ambient (maximum 85° F.); thus, stressing the animal.

Several devices have been proposed and patented which address the problem of controlling the environment of a pet. U.S. Pat. No. 4,899,693 by Arnold discloses a Cooled Pet Bed and uses ice cubes placed within a container underneath an open weave mattress. U.S. Pat. No. 4,939,911 by Mandell discloses a Vehicular Kennel for Pets. This device uses the Peltier effect to cool a kennel within the vehicle. Mandell takes his power from the vehicle, the vehicle battery and/or a solar panel mounted on the vehicle and uses forced air to cool the enclosure. U.S. Pat. No. 5,727,503 by Whittaker discloses a Portable Cooling Kennel System that uses ice as the cooling medium. Ice is placed in a sliding tray underneath the enclosure area and air is drawn over the ice around the enclosure and exhausted at the top. Whittaker discusses "forced air" and fans, but never shows how the power is derived. Furthermore, the "ice storage area" is limited and the cooling supply will not last long. U.S. Pat. No. 5,887,436 by Duddleston discloses a Portable Cooled Pet Carrier that, like Mandell, uses the Peltier effect to provide cooling for the animal.

U.S. Pat. No. 5,761,992 by Gallo discloses a Portable Animal Storage Unit that is designed to preserve the meat of game animals while being transported. The disclosure mentions that DC power may be used for cooling, but never makes a full disclosure.

U.S. Pat. No. 3,175,534 discloses a pet drying device that uses a restrictive enclosure to house a wet animal while hot air is blown over the animal. The concept could be expanded to blow ambient air over an animal to keep it cool; however, if the ambient air is greater than 85 degree Fahrenheit, the animal will not do well.

All the prior art directly applying to keeping enclosed animals environmentally comfortable, while worthwhile, can only work on paper. No attention has been paid to the size of the Peltier device that would be required to condition an enclosure. The inventors have assumed that power is readily available (which is true in the case of a vehicle, but even in a vehicle the power is limited to some 10 amps at 12 Volts DC—120 Watts). No power is readily available on the tarmac of an airport, in an airplane cargo hold or in a warehouse/baggage facility. Furthermore to properly run a compressor-type refrigeration system it will take at least 1000 watts. Whittaker, while proposing ice as the cooling medium, provides no data as to the length that his device would keep the animal cool. Furthermore, no provision is made for reducing heat transfer.

Thus there remains a need for a working portable air-conditioned animal carrier that will maintain the environment for the enclosed at a comfortable temperature under high ambient temperature conditions and that is easily maintained and relatively inexpensive. The carrier should include a simple fail-safe system that will provide its own source of power for ventilation and have a natural backup if there is a power failure. Finally there remains a need for a system that will operated for at least 12 hours, which is a recognized time period for transporting a animal door to door by common carrier.

SUMMARY OF THE INVENTION

The preferred embodiment of the instant invention consists of an insulated outer carrier with internal compartments and a hinged door with ventilation holes. The door may be transparent, translucent or opaque. One compartment is for the animal and the other compartment is used for storing the cooling medium, which is commonly available crushed ice. A heat exchanger is placed at the bottom of the ice compartment. A further compartment is provided for storing ancillary equipment within the container.

A low power electric fan draws air from the outside, through the heat exchanger, into the animal compartment and forces the air out of the ventilation holes in the animal compartment door. A protected switch (one that is not easily turned on or off) controls the electric fan and a lead-gel battery provides power to the fan via a thermostatic switch. The thermostatic switch controls the animal compartment temperature within a narrow range between 73° F. and 76° F. This range can be maintained with ambient temperatures up to 120° F.

Direct current power may be supplied from two sources depending on the use of the instant invention. If local DC power at 12 volts is available (cigar lighter) then power is preferably taken from this source. The alternate source is a lead-gel 12-volt battery that is kept within the device. Both the internal battery and external power may be used at the same time, if required.

The intermittent fan—temperature controlled—makes the ice last at least twelve hours on a full load (20 pounds) of ice.

If the fan is turned off and the pet removed, the ice will last at least one full day. Upon a failure of the ventilation system power, the mere fact that the heat exchanger is immersed in ice will cause ventilation air to "backflow" therefore providing air, at ambient temperature to the animal.

DETAILED DESCRIPTION OF THE EMBODIMENT

Figure 1:
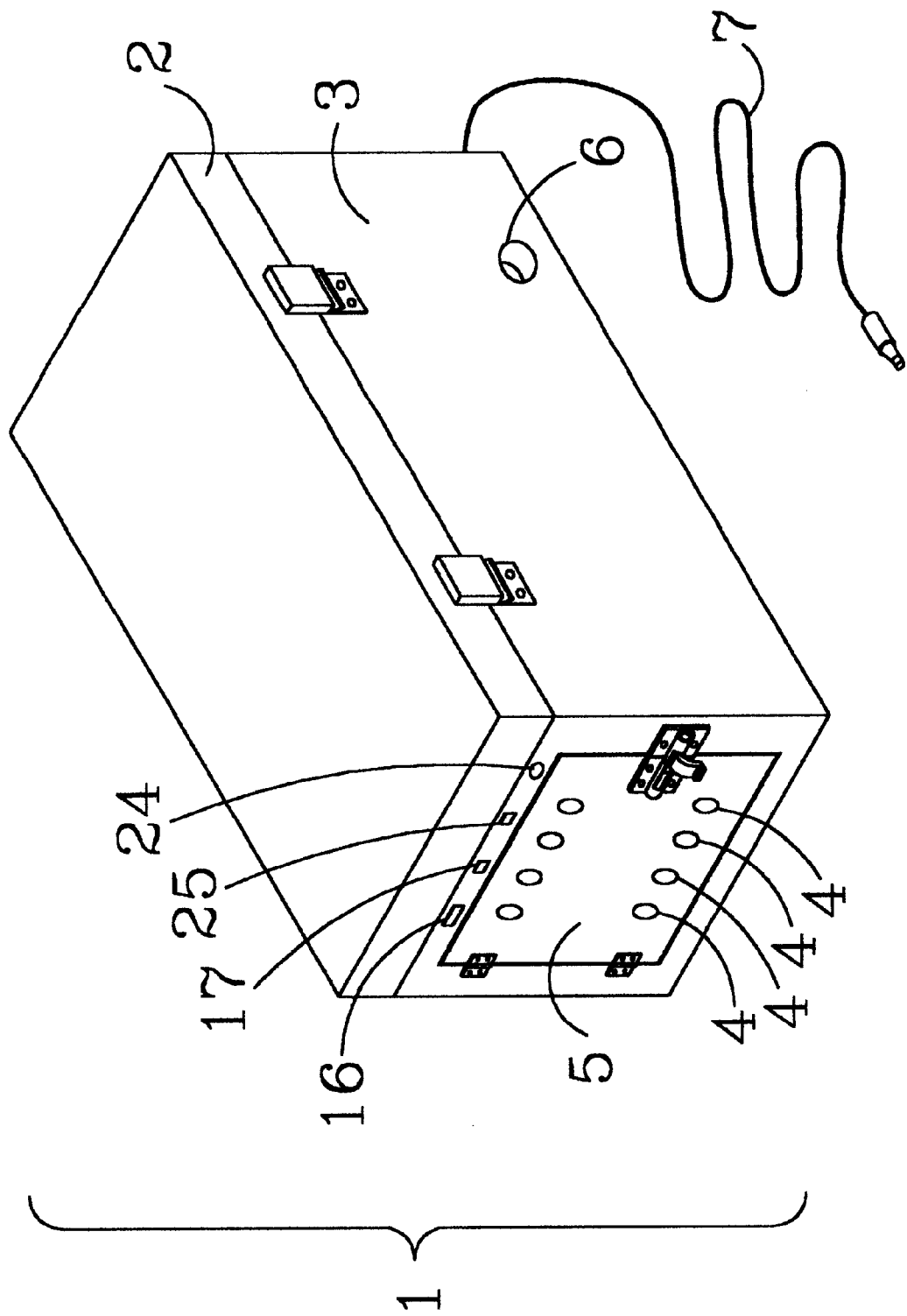
FIG. 1 shows the preferred embodiment of the instant device with the access door and lid in their closed position.
Figure 2:
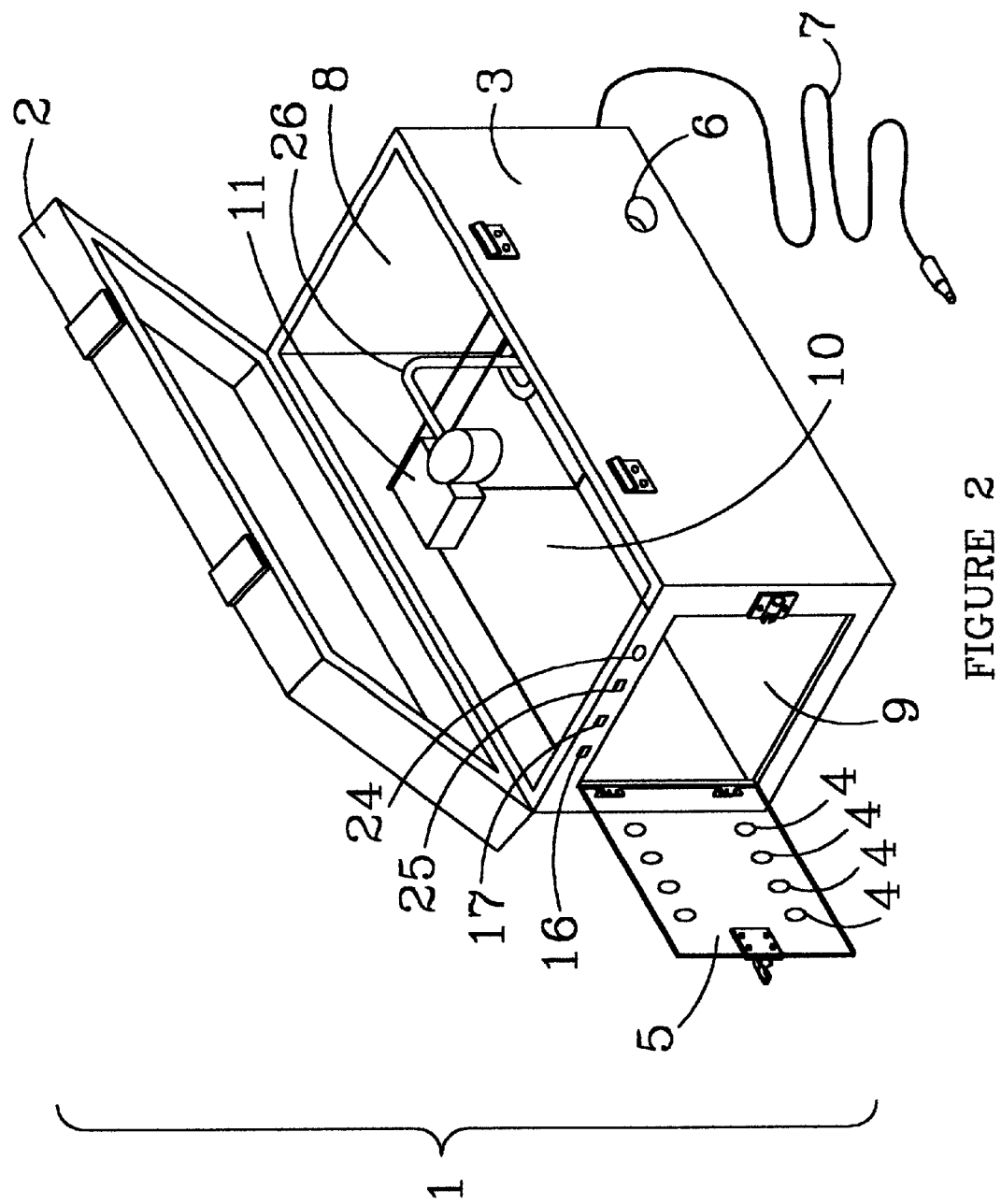
FIG. 2 shows the preferred embodiment of the instant device with the access door and lid in their open position. Actual wiring and the thermostat are not shown for clarity.

Referring to FIGS. 1 and 2, the instant invention, generally item 1, is made from a well-insulated container. (In the prototype a brand name ice chest formed the carrier and the ice compartment.) The interior of the container is divided into three compartments: the animal compartment, 9, the ice compartment, 8, and the storage compartment, 10. These compartments are located in the lower section, 3, of the container or carrier. The carrier has a lid, 2, which provides access to the ice, 8, and storage, 10, compartments.

FIG. 2 shows the storage compartment, 10, and the ice compartment, 8, located next to the animal compartment, 9. The storage compartment, 10, is located immediately above the animal compartment, 9, and effectively forms the top of the animal compartment, 9. Thus, when the lid, 2, is opened, for whatever reason, the animal cannot leave the animal compartment, 9. The ice, 8, animal, 9, and storage, 10, compartments are in communication with each other, as will become apparent in the preferred embodiment.

The animal entry door, 5, has a series of ventilation holes, 4, drilled or formed in the door, 5. The ventilation fan, 12, is placed within the animal compartment and draws air through the fan duct, 13, the heat exchanger, 14, the inlet duct, 15, (all shown in FIGS. 4 and 5), and the air inlet port, 6. The ventilation fan, 12, the fan duct, 13, the heat exchanger, 14, the inlet duct, 15, and the air inlet port, 6, together form the air handling unit, 26.

An optional battery, 11, is kept in the storage compartment, 10, to provide power to the ventilation fan, 12. The power cord, 7, generally supplies power which can be connected to a cigar lighter socket or equivalent source of DC power at 12 volts. The electric system may be set up to charge the optional battery, 11, preferably a lead-gel, whenever the power cord is plugged into a source of power. Power flows from the power cord, 7, (or battery, 11) to the power switch, 16, through the thermostat, 18, and to the ventilation fan, 12. An optional indicator light, 17, lights whenever the fan, 12, is running. (An optional audible alarm, 24, and alarm silencer control, 25, is shown.) The thermostat, 18, is set at 74° F. and serves to keep the animal compartment, 9, between 73° F. and 76° F. Note for convenience, the power cord, 7, can be removed from the carrier, 1, at the power plug, 19, located at the end opposite to the animal entry door, 5. The locations of the power plug, 19, control switches (16 and 25), alarms and indicator lights (17 and 24), etc. may be anywhere on the device; the particular locations shown are the most convenient.

Figure 3:
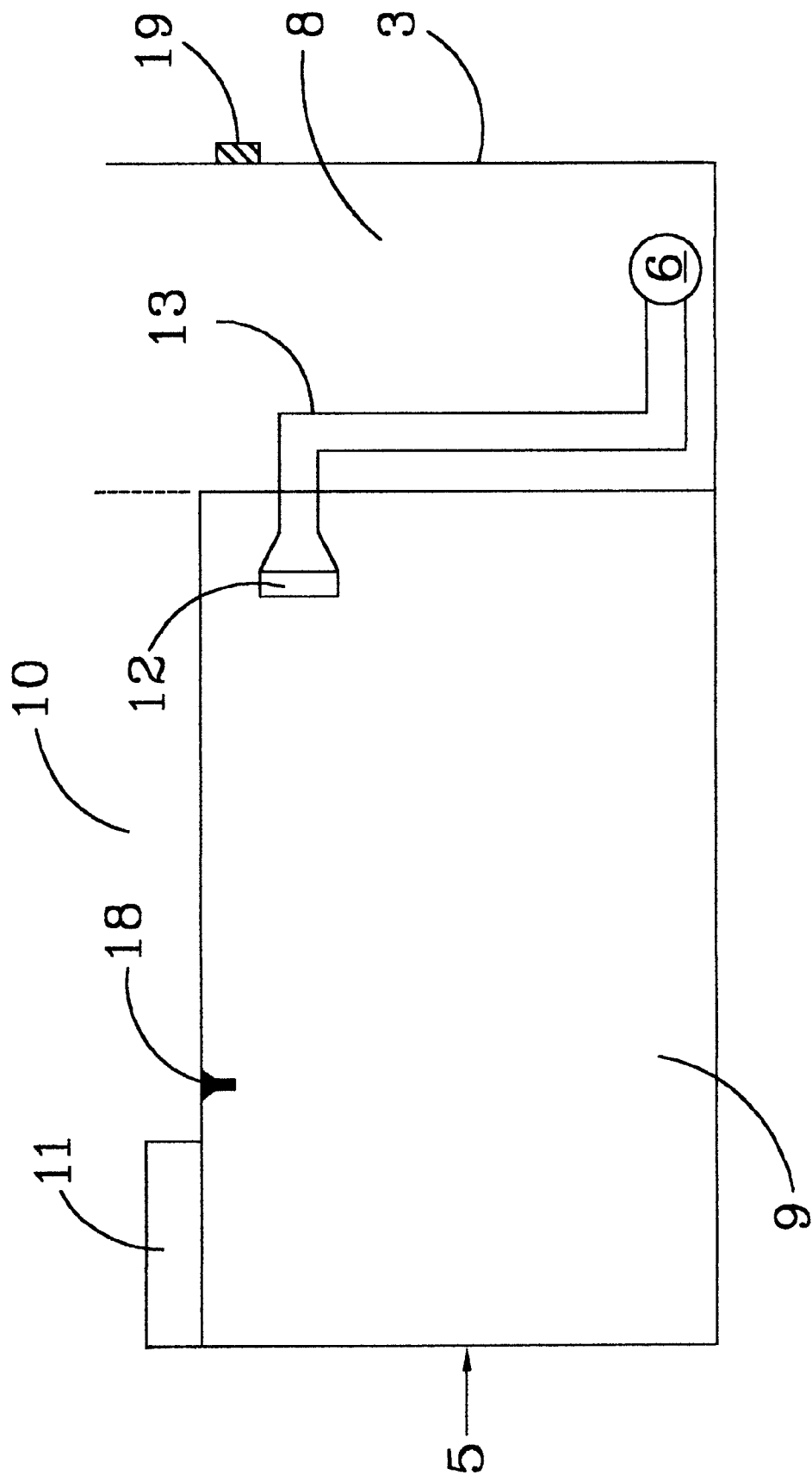
FIG. 3 is a side view of the lower section of the carrier showing the compartments and other internals.

In the preferred embodiment, the animal compartment, 9, or chamber takes about 75% of the space available in the carrier, 1. The ice compartment, 8, takes roughly 20% and the storage compartment, 10, takes the remaining space. (See FIG. 3.) The animal compartment, 9, is separated from the storage, 10, and ice, 8, compartments by ¼-inch clear plastic. (In the prototype a branded name reinforced plastic was used.) The storage compartment, 10, and the ice compartment, 8, are accessible by raising the carrier lid, 2. This compartment, 10, houses the optional (lead-gel) battery, 11,—used for stand-alone operations. The storage compartment, 10, will also provide storage space for animal food, papers, an optional drain hose (not shown) for draining the ice compartment, 8, of water, and other items or supplies required by the animal owner.

Figure 4:
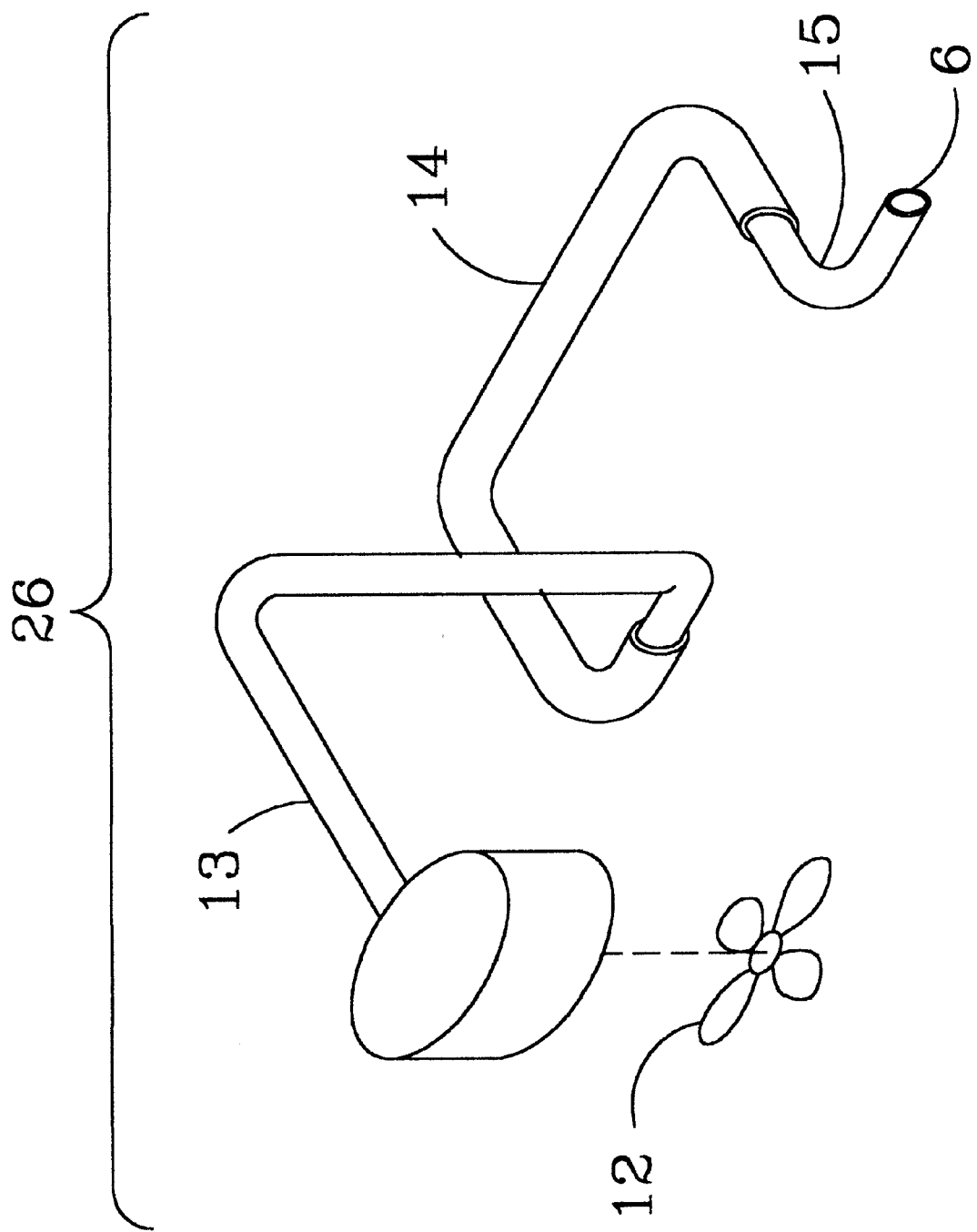
FIG. 4 shows the arrangement of the preferred fan ducting and heat exchanger.
Figure 5:
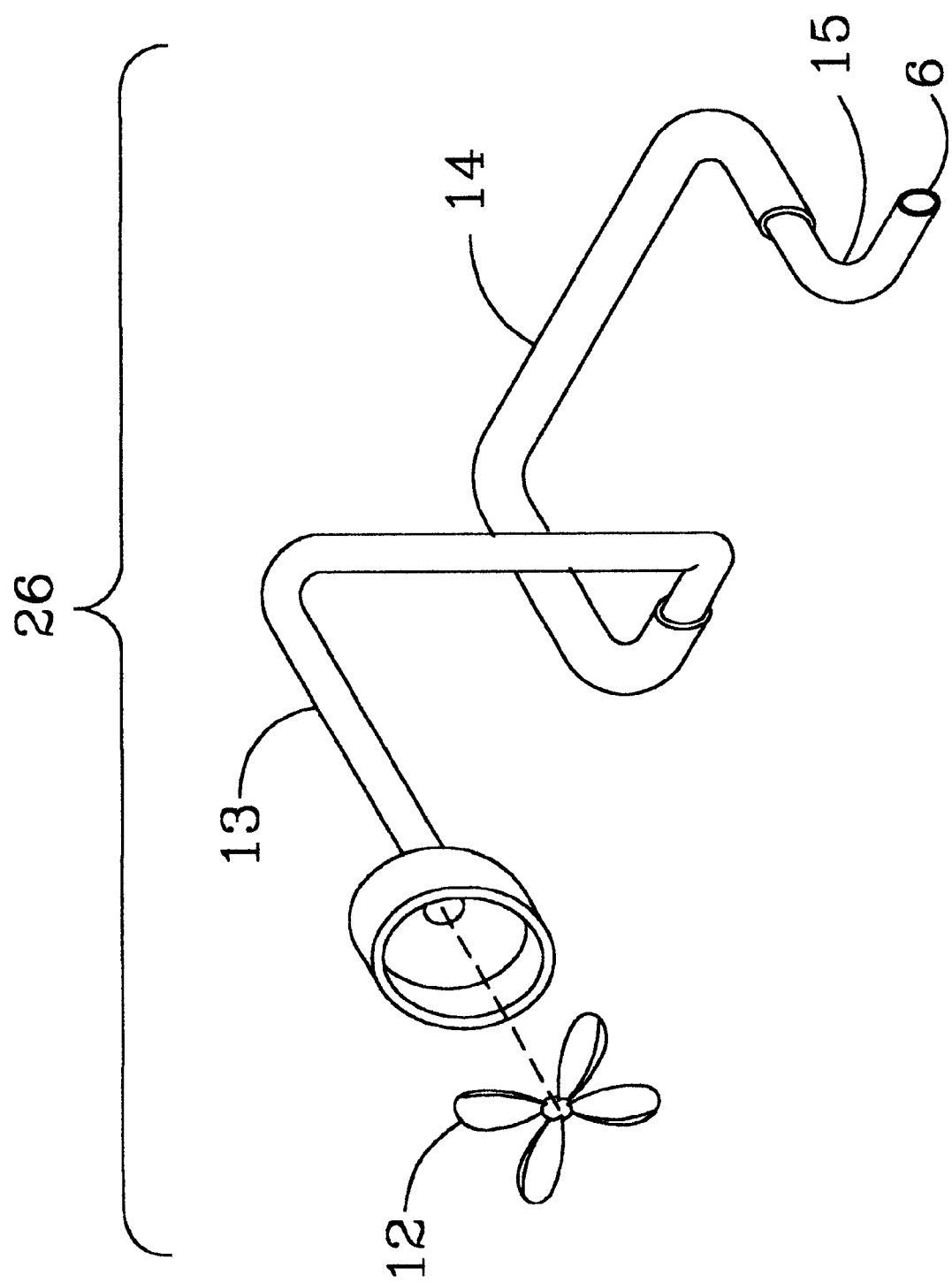
FIG. 5 shows an alternate arrangement of the preferred fan ducting and heat exchanger.

The air handling unit, 26, is shown in FIGS. 4 and 5. Air is drawn in the inlet port, 6, through a copper heat exchanger, 14, and by a (small DC powered) ventilation fan, 12. Assuming the worst design case, outside air at 120° F. is brought through the heat exchanger, 14, and lowered to 50° F. The heat exchanger, 14, operates against crushed ice in the ice compartment, 8, to obtain this temperature. Of course, if the ambient temperature is lower, the cooled air will be lower in temperature. The cooled air is discharged into the animal compartment, 9. FIG. 4 shows the preferred arrangement for the fan, 12, heat exchanger, 14, and associated duct, 13, as shown in FIG. 2. FIG. 5 shows an alternate embodiment where the ventilation fan, 12, ducts sideways into the animal compartment.

As stated earlier, a thermostat, 18, which is set to operate at 74° F., cycles the ventilation fan, 12, (blower) on and off. On, if the temperature is above 74° F., and off, if the temperature is below 74° F. The deadband in the thermostat maintains the animal compartment temperature between 72° F. and 76° F. (give or take a few degrees). Assuming a animal heat load of 50 BTU, a full load (20 pounds) of ice will last over twelve hours. (It is known that 20 pounds of ice will provide 2880 BTU of cooling.) The fan, 12, draws about 0.3 amps at 12 volts (4 watts), and a properly sized lead-gel battery, 11, will maintain itself for well over twelve hours. Therefore, with a properly sized battery the carrier will operate for a long period providing the ice is replenished. Therefore adequate cooling of and ventilation for the animal will be provided by the heat exchanger-fan system.

In the preferred embodiment, the design envisions a failure of the cooling/ventilating fan, 12, due to power failure, fan failure, thermostat failure, or even due to inadvertent action of the power switch, 16. Heat build up within the animal compartment, 9, is handled through conduction and convection of the heat from the compartment, 9, to the ice, 8, and storage, 10, compartments through the plastic barrier between the compartments. Thus, it can be seen that the storage compartment, 10, while providing storage, provides part of a fail-safe system design. In the failure mode the operation is not very efficient; however, it will maintain the animal compartment at 85° F. in an ambient temperature of 120° F. The animal may be uncomfortable, but it will survive.

When the ventilation fan, 12, is not operating, the airflow reverses in the enclosure providing ventilation for the animal. Air exits from the heat exchanger, 4, out through the inlet port, 6. This reverse airflow occurs because of the difference in air density. The air in the heat exchanger, 14, is cool and therefore denser than the ambient air. The cool air "falls" out of the exchanger, 14, and out of the inlet port, 6. Make up air is drawn in through the entry door ventilation holes, 4, back through the fan, 12, the fan duct, 13, and into the heat exchanger, 14. Thus, the animal will have a constant source of fresh ambient temperature air.

Thus, the preferred embodiment of instant device will serve to keep an animal cool in an ambient temperature of 120° F. for at least twelve hours. The device will work in higher temperatures, but not as long. The device will meet the criteria of common carriers and allow for the shipment of live animals when the ambient temperature exceeds 85° F. and will operate safely up to 120° F.

Figure 6:
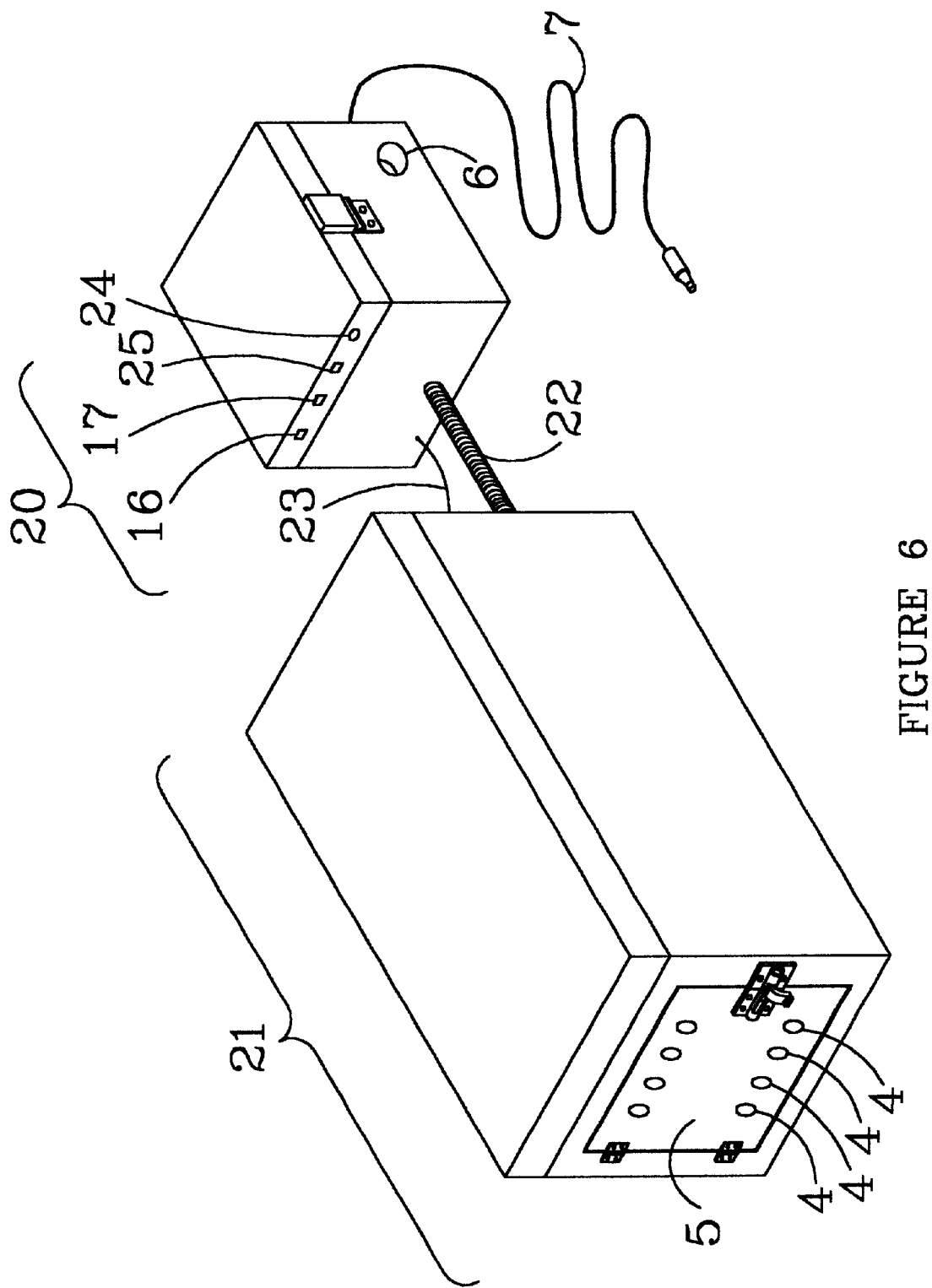
FIG. 6 shows an alternate embodiment of the instant device where the fan, ice and power source are separate from the animal container.

FIG. 6 shows an alternate embodiment of the instant device that would be of great benefit to animal handlers and the like. Animal handlers need to take animals to animal shows, performances and the like. Generally the animal is carried to and from a performance or a show in a mini-van and kept in a wire cage. Keeping the animal cool in summer is still a problem.

The alternate embodiment envisions an insulated liner placed within a standard wire cage and attached to the wire cage. Thus, all four sides, the top and the bottom of the cage would be insulated. (Standard building styrene building insulation sheets would be ideal.) In fact it is probably not necessary to use an outside wire cage with a properly trained animal, and a styrene box forming an insulated animal container unit, 21, shaped similarly to that shown in FIG. 6 may be employed. Ventilation holes, identical in function to those in the preferred device, are placed in the unit entry door.

A power/ice chest unit provides cooling to the insulated compartment, 21, through an air hose, 22. Control switches and alarms (16, 17, 24 and 25) would be contained within the secondary ice/power container, 20. A thermostat would be placed within the insulated animal compartment and coupled to the secondary ice/power container by a thermostat control wire, 23. Power is supplied by a lead-gel battery, from the vehicle, or both (as previously described).

The same design of fan, 12, fan duct, 13, heat exchanger, 14, inlet duct, 15, and inlet air port, 6, as previously described is used in the secondary ice/power container, 20, except that the side discharge embodiment of FIG. 5 would be used. The only difference is that the fan outlet is ducted to the animal compartment by an air hose, 22. The air hose is standard 4-inch dryer ventilation hose that would attach directly to the fan duct. Upon a power failure, fan failure, or the like, reverse ventilation of the animal compartment would commence as previously described. It must be noted, however, that the animal compartment temperature will equalize at the ambient temperature which may exceed 85 degrees Fahrenheit.

An optional alarm system may (set by the consumer or manufacturer) be incorporated into the secondary ice/power container, 20. This alarm would be tripped when the animal compartment exceeds 85 degrees Fahrenheit and should be coupled to the vehicle's alarm system or horn. Such circuitry is well known in the electronic industry and may readily be designed by a competent practitioner.

Additional controls, other than the power switch, 16, and indicator light, 17, may be added to or removed from the device. An audible alarm, 24, may be employed to warn of high temperature due to some form of component failure. On the other hand, it may be necessary to have an alarm silencer control, 25. Simple forms of the device may not require an on/off (power) switch or indicator light. The consumer would make these choices.

There has been disclosed the best, preferred, and alternate modes of the invention. Suggested materials are not seen as a limitation on the device. Slight changes in the design may result in more or less space to the animal, the ice compartment and the storage compartment and is seen as part of this disclosure. It is the intent that the appended claims cover all such changes and modifications.

What is claimed is:

1. An intrinsically safe air-conditioned animal transporter for safely transporting animals in unpleasant temperature environments comprising:
   an animal compartment for restraining an animal that is being transported;
   an ice compartment for holding ice;
   an air handling unit for handling air; and
   means for providing power to said air handing unit,
   wherein said air handling unit connects between said animal compartment and said ice compartment normally drawing air into said animal compartment while exchanging heat with said ice within said ice compartment, thereby providing conditioned air to said animal compartment.

2. The apparatus of claim 1 wherein said air handling unit further comprises:
   a fan;
   a fan duct;
   a heat exchanger having a first end and a second end; and
   an inlet duct
   wherein said fan is contained within said fan duct, said fan duct being attached to and in communication with said heat exchanger at said first end thereof, and said inlet duct being attached to and in communication with said heat exchanger at said second end thereof whereby said heat exchanger is capable of exchanging heat between air flowing through said air handling unit and said ice contained within said ice compartment.

3. The apparatus of claim 2 wherein said means for providing power is a battery.

4. The apparatus of claim 3 further comprising a thermostat contained within said animal compartment for controlling air temperature within said animal compartment by modulating said battery power to said fan in response to temperature variations within said animal compartment.

5. The apparatus of claim 1 further comprising a thermostat contained within said animal compartment for controlling air temperature within said animal compartment by modulating said means for providing power in response to temperature variations within said animal compartment.

6. The apparatus of claim 1 wherein said transporter is placed within a vehicle and wherein said means for providing power is furnished by the vehicle.

7. The apparatus of claim 1 further comprising a container whereby said animal compartment, said ice compartment and said air handling unit are located within said container, with said compartments having-walls, such that said ice compartment and said animal compartment share a common boundary wall.

8. The apparatus of claim 7 wherein said container is insulated.

9. The apparatus of claim 1 further having a lid whereby when said lid is open said ice compartment is accessible.

10. The apparatus of claim 7 whereby, upon failure of any component associated with said air handling unit, intrinsic safety is provided by natural reverse flow of air through said animal compartment through said heat exchanger of said air handling unit and out said inlet duct thus providing fresh air to the animal restrained in said animal compartment whereas temperature conditioning is provided by heat transfer between said common boundary wall between said animal compartment and said ice compartment.

11. An intrinsically safe air-conditioned animal transporter for safely transporting animals in unpleasant temperature environments comprising:

an insulated container;

an animal compartment having walls for restraining an animal that is being transported;

an ice compartment having walls for holding ice;

a fan;

a fan duct;

a heat exchanger having a first end and a second end;

an inlet duct; and power means supplying said fan;

whereby said animal compartment and said ice compartment are located within said container such that said ice compartment and said animal compartment share a common boundary wall; and wherein said fan is contained within said fan duct, said fan duct having first and second ends said first end being attached to and in communication with said animal compartment and said second end being attached to said heat exchanger at said first end of said heat exchanger, and said inlet duct being attached to and in communication with said heat exchanger at said second end of said heat exchanger whereby said heat exchanger is capable of exchanging heat between air flowing through said air handling unit and said ice contained within said ice compartment, thereby said fan normally draws air into said animal compartment and through said heat exchanger, thereby exchanging heat with said ice within said ice compartment, and thereby providing conditioned air to said animal compartment.

12. The apparatus of claim 11 wherein said power means is a battery.

13. The apparatus of claim 12 further comprising a thermostat contained within said animal compartment for controlling air temperature within said animal compartment by modulating said power from said battery to said fan in response to temperature variations within said animal compartment.

14. The apparatus of claim 11 further comprising a thermostat contained within said animal compartment for controlling air temperature within said animal compartment by modulating said power means in response to temperature variations within said animal compartment.

15. The apparatus of claim 11 wherein said transporter is placed within a vehicle and wherein said power means is furnished by the vehicle.

16. The apparatus of claim 11 whereby, upon failure of any component associated with said fan, intrinsic safety is provided by natural reverse flow of air through said animal compartment through said heat exchanger of said air handling unit and out said inlet duct thus providing fresh air to the animal restrained in said animal compartment whereas temperature conditioning is provided by heat transfer between said common boundary wall between said animal compartment and said ice compartment.

17. An air-conditioned animal transporter for safely transporting animals in unpleasant temperature environments comprising:

an animal compartment for restraining an animal that is being transported;

an ice compartment for holding ice;

an air handling unit for handling air having;

a fan;

a fan duct;

a heat exchanger having a first end and a second end;

an inlet duct;

an outlet;

an air hose having a first end and a second end wherein said first end is connected to said animal compartment and said second end is connected to said outlet of said air handling unit; and means for providing power to said fan, wherein said air handling unit is totally contained within said ice compartment; and wherein said fan is contained within said fan duct, said fan duct having first and second ends said first end being attached to and in communication with said outlet and said second end being attached to heat exchanger at said first end of said heat exchanger, and said inlet duct being attached to and in communication with said heat exchanger at said second end of said heat exchanger whereby said heat exchanger is capable of exchanging heat between air flowing through said heat exchanger and said ice contained within said ice compartment, thereby said fan forces air into said air hose and into animal compartment by drawing through said heat exchanger, thereby exchanging heat with said ice within said ice compartment, and thereby providing conditioned air to said animal compartment.

18. The apparatus of claim 17 further comprising a thermostat contained within said animal compartment and connected to said means for providing power for controlling air temperature within said animal compartment by modulating said means for providing power in response to temperature variations within said animal compartment.

19. The apparatus of claim 11 wherein said means for providing power is a battery.

20. The apparatus of claim 17 wherein said transporter is placed within a vehicle and wherein said means for providing power is furnished by the vehicle.

* * * * *